United States Patent
Fujisawa et al.

(10) Patent No.: US 9,725,587 B2
(45) Date of Patent: Aug. 8, 2017

(54) INJECTION MOLDED ARTICLE

(75) Inventors: Tomoyuki Fujisawa, Tokyo (JP); Tatsuo Abe, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 340 days.

(21) Appl. No.: 13/876,867

(22) PCT Filed: Sep. 30, 2011

(86) PCT No.: PCT/JP2011/072567
§ 371 (c)(1),
(2), (4) Date: Mar. 29, 2013

(87) PCT Pub. No.: WO2012/043794
PCT Pub. Date: Apr. 5, 2012

(65) Prior Publication Data
US 2013/0203932 A1    Aug. 8, 2013

(30) Foreign Application Priority Data

Sep. 30, 2010    (JP) ................................. 2010-223112
Sep. 30, 2010    (JP) ................................. 2010-223114

(51) Int. Cl.
*C08L 25/06*    (2006.01)
*B29C 45/26*    (2006.01)
(Continued)

(52) U.S. Cl.
CPC .......... *C08L 25/06* (2013.01); *B29C 45/0005* (2013.01); *B29C 45/0013* (2013.01);
(Continued)

(58) Field of Classification Search
CPC . C08L 25/06; B29C 45/2669; B29C 45/0013; B29C 45/0005; B29C 45/0025
See application file for complete search history.

(56) References Cited

U.S. PATENT DOCUMENTS 5,851,474 A    12/1998 Allan et al.
6,371,747 B1    4/2002 Niina et al.
(Continued)

FOREIGN PATENT DOCUMENTS

CN    1273167 A    11/2000
CN    1723109 A    1/2006
(Continued)

OTHER PUBLICATIONS

Kim, et al., "Shiny Solid Surface Structural Foam Injection-Molded Parts With Rapid Mold Temperature Control by MmSH Process (Momentary Mold Surface heating and Cooling Process)", Soonchunhyang University, Technical Session T52, 2002, 4 pages.*
(Continued)

*Primary Examiner* — Peter D Mulcahy
(74) *Attorney, Agent, or Firm* — Birch, Stewart, Kolasch & Birch, LLP

(57) ABSTRACT

An injection molded article obtained by injection molding a thermoplastic resin composition comprising 100 parts by mass of a thermoplastic resin and 50 parts by mass or less of at least one of a filler and a colored metallic pigment, wherein at least one weld exists, and a long diameter of 95% by mass or more of the filler existing within a cross-sectional depth of 50 μm or less from a surface of the weld is parallel to the surface of the weld.

8 Claims, 4 Drawing Sheets

(51) Int. Cl.
B29C 45/00 (2006.01)
B29C 45/17 (2006.01)
B29C 45/73 (2006.01)

(52) U.S. Cl.
CPC ...... *B29C 45/0025* (2013.01); *B29C 45/2669* (2013.01); *B29C 45/0046* (2013.01); *B29C 45/1703* (2013.01); *B29C 45/174* (2013.01); *B29C 2045/0044* (2013.01); *B29C 2045/1722* (2013.01); *B29C 2045/7356* (2013.01); *B29C 2045/7393* (2013.01)

(56) References Cited

U.S. PATENT DOCUMENTS

| | | | |
|---|---|---|---|
| 8,663,537 B2 * | 3/2014 | Stensvad | B29C 45/73 264/328.16 |
| 2006/0110576 A1 | 5/2006 | Obara et al. | |
| 2006/0251754 A1 | 11/2006 | Herring | |
| 2007/0092595 A1 | 4/2007 | Yoshino et al. | |
| 2007/0190203 A1 | 8/2007 | Kim et al. | |

FOREIGN PATENT DOCUMENTS

| | | |
|---|---|---|
| JP | 59-107223 U | 7/1984 |
| JP | 5-285990 A | 11/1993 |
| JP | 7-102139 A | 4/1995 |
| JP | 7-156299 A | 6/1995 |
| JP | 7-276410 A | 10/1995 |
| JP | 8-151502 A | 6/1996 |
| JP | 8-157670 A | 6/1996 |
| JP | 2524922 B2 | 8/1996 |
| JP | 9-1611 A | 1/1997 |
| JP | 10-15981 A | 1/1998 |
| JP | 10-100156 A | 4/1998 |
| JP | 10-279828 A | 10/1998 |
| JP | 2000-158505 A | 6/2000 |
| JP | 2000-289074 A | 10/2000 |
| JP | 2002-212440 A | 7/2002 |
| JP | 2002-284944 A | 10/2002 |
| JP | 2002-292703 A | 10/2002 |
| JP | 3349070 B2 | 11/2002 |
| JP | 2003-25354 A | 1/2003 |
| JP | 2003-200477 A | 7/2003 |
| JP | 2004-130528 A | 4/2004 |
| JP | 3664576 B2 | 6/2005 |
| JP | 2005-321101 A | 11/2005 |
| JP | 2005-342922 A | 12/2005 |
| JP | 2006-205571 A | 8/2006 |
| JP | 2006-206674 A | 8/2006 |
| JP | 3819972 B2 | 9/2006 |
| JP | 2008-188855 A | 8/2008 |
| JP | 4052600 B2 | 8/2008 |
| JP | 2009-248423 A | 10/2009 |
| KR | 10-2004-0082930 A | 9/2004 |

OTHER PUBLICATIONS

Anonymous, "Flowing hot and cold brings product improvement.", British Plastics & Rubber, Apr. 1, 2009, 5 pages.
Chen et al., "Dynamic Mold Surface Temperature Control Using Induction Heating and Its Effects on the Surface Appearance of Weld Line", Journal of Applied Polymer Science, vol. 101, Jan. 2006, XP007901695, pp. 1174-1180.
European Search Report, dated Jan. 9, 2015, for European Application No. 11829347.1.
Kang, "Wonder Injection Molding with Momentary Mold Surface Heating Process (E-Mold Process)", CAE Molding Conference 2007, ACMT, Sep. 4, 2007, 8 pages.
Knights, "Hot/Cold Thermal Cycling of Injection Molds Heats Up", Plastics Technology, Apr. 2010, 4 pages.
Meddad et al., "Weldline Strength in Glass Fiber Reinforced Polyamide 66", Polymer Engineering & Science, vol. 35, No. 11, Jun. 1995, pp. 893-901.
Park et al., "Eliminating weldlines of an injection-molded part with the aid of high frequency induction heating", Journal of Mechanical Science and Technology, vol. 24, Jan. 2010, pp. 149-152.
Sanschagrin et al., "Effect of filler shape on weld lines in polypropylene", Plastics Compounding, May/Jun. 1987, vol. 10, pp. 37, 38, 40, 42, 43, 45, 48.
Tomari, "Improvement of Weldline Strength of Fiber Reinforced Polycarbonate Injection Molded Articles Using Simultaneous Composite Injection Molding", Advances in Polymer Technology, vol. 14, No. 1, Jan. 1995, pp. 25-34.
Wheeler, "8 Flow and Weld Lines in Mass Pigmented Applications: 8.1 Description and origins", Metallic Pigments in Polymers, Jan. 1999, XP55158349, pp. 81-103.
Yamada et al., "Evaluation of Mechanical Properties of Adjacent Flow Weldline", Polymer Engineering and Science, vol. 45, Jan. 2005, pp. 1180-1186.
Yao et al., "Rapid Thermal Cycling of Injection Molds: An Overview on Technical Approaches and Applications", Advances in Polymer Technology, vol. 27, No. 4, Sep. 2008, pp. 233-255.
International Search Report for International Application No. PCT/JP2011/072567 dated Dec. 20, 2011.

* cited by examiner

INJECTION MOLDED ARTICLE

TECHNICAL FIELD

The present invention relates to an injection molded article.

BACKGROUND ART

The conventional injection molding of thermoplastic resins has a problem such that a poor appearance such as flow marks and weld lines is likely to occur in a gate and a weld during injection molding. The flow marks and weld lines are more likely to remarkably occur in the case of thermoplastic resin compositions containing a thermoplastic resin and a filler such as a colored metallic pigment or a glass fiber or inorganic filler having a high aspect ratio. Here, the "weld" means a portion produced by flows of a molten resin that merge and fuse together inside of a mold cavity. The "weld line" means only a wedged fine depression produced in the weld on a surface of a molded article, for example as shown in FIG. 2 by referential numeral 5.

Then, to improve the weld line, various techniques, methods, and products have been reported: for example, a technique for making a mold temperature high (for example, see Patent Documents 1 and 2), and a method for performing heating such that a resin melting temperature and a mold temperature are a resin deflection temperature under load or more, and molding a resin by setting the temperature of the molten resin at a predetermined temperature, and its product (for example, see Patent Document 3). Another molding method has been reported in which the surface of a mold is heated selectively to a temperature equal to or more than a heat distortion temperature, a molten resin is fed into a mold cavity, and a shear force is partially applied to the molten resin to improve flow unevenness inside of a weld (for example, see Patent Document 4).

CITATION LIST

Patent Document

Patent Document 1: Japanese Patent No. 4052600
Patent Document 2: Japanese Patent Application Laid-Open No. 2009-248423
Patent Document 3: Japanese Patent Application Laid-Open No. 2003-200477
Patent Document 4: Japanese Patent Application Laid-Open No. 9-1611

SUMMARY OF INVENTION

Technical Problem

If the techniques according to Patent Documents 1 to 3 are used, however, the weld line is improved, but problems are still left unsolved: for example, a poor appearance occurs due to flow unevenness in the weld such as uneven orientation of the colored metallic pigment (unevenness in stripes, hereinafter, referred to as "strip-like unevenness"), and the entire molded article is difficult to obtain consistent sharpness; or these techniques have room for improvement in brightness of the entire surface of the molded article and a deep metallic color tone. Moreover, if the technique according to Patent Document 4 is used, the flow unevenness inside of the weld is partially improved, but the shape of the molded article is limited because a shear force is applied. Additionally, transmission efficiency of the shear force makes it difficult to sufficiently reduce the strip-like unevenness in all the welds in the molded article. Further, the technique according to Patent Document 4 needs to be further improved in consistent brightness in the entire surface of the molded article, and the like.

Then, the present invention has been made in consideration of such circumstances. An object of the present invention is to provide an injection molded article comprising a thermoplastic resin composition comprising a thermoplastic resin and a filler, and having sufficiently reduced strip-like unevenness in a weld and consistent sharpness.

Another object of the present invention is to provide an injection molded article comprising a thermoplastic resin composition comprising a thermoplastic resin and a colored metallic pigment, and having sufficiently reduced strip-like unevenness in a weld, consistent brightness in the entire surface of the injection molded article, and a luxurious and deep metallic color tone.

Solution to Problem

As a result of extensive research to solve the problems above, the present inventors found out that in an injection molded article comprising a thermoplastic resin composition comprising a thermoplastic resin and a filler, if fountain flow in a weld is suppressed, the filler existing within a range of 50 µm or less from the surface of the weld is oriented in a predetermined state; thereby, strip-like unevenness is sufficiently reduced, leading to consistent sharpness. Thus, the present invention has been completed.

As a result of extensive research to solve the problems above, the present inventors also found out that in an injection molded article comprising a thermoplastic resin composition comprising a thermoplastic resin and a colored metallic pigment, if fountain flow in a weld is suppressed, the colored metallic pigment existing within the range of 50 µm or less from the surface of the weld is oriented in a predetermined state; thereby, the strip-like unevenness is sufficiently reduced, leading to consistent brightness in the entire surface of the molded article. Thus, the present invention has been completed.

Namely, the present invention is as follows.

[1] An injection molded article obtained by injection molding a thermoplastic resin composition comprising 100 parts by mass of a thermoplastic resin and 50 parts by mass or less of a filler, wherein at least one weld exists, and a long diameter of 95% by mass or more of the filler existing within a cross-sectional depth of 50 µm or less from a surface of the weld is parallel to the surface of the weld.

[2] The injection molded article according to [1], wherein the filler contains 0.1 to 20 parts by mass of a colored metallic pigment based on 100 parts by mass of the thermoplastic resin.

[3] The injection molded article according to [1] or [2], wherein the injection molded article is obtained by injection molding the thermoplastic resin composition under a temperature condition in which a difference between a mold temperature and a temperature of the thermoplastic resin composition is 0 to 60° C.

[4] The injection molded article according to any one of [1] to [3], wherein the injection molded article is obtained by the injection molding using a mold including a product cavity and a spillover cavity located downstream, in a flow direction of the thermoplastic resin composition, of the product cavity.

[5] The injection molded article according to any one of [1] to [4], wherein the injection molding is gas-assist molding.
[6] The injection molded article according to any one of [1] to [5], wherein the thermoplastic resin contains a non-crystalline resin, and is injection molded at a mold temperature 60° C. or more higher than a glass transition temperature of the non-crystalline resin.
[7] The injection molded article according to any one of [1] to [6], wherein the thermoplastic resin contains a styrene resin.
[8] The injection molded article according to any one of [1] to [5], wherein the thermoplastic resin contains a crystalline resin, and is injection molded at a temperature 20° C. or more higher than a melting point of the crystalline resin.
[9] The injection molded article according to any one of [1] to [8], wherein the injection molded article is used as an interior part for automobiles.
[10] The injection molded article according to any one of [1] to [8], wherein the injection molded article is used as a casing for electrical and electronic parts.

Advantageous Effects of Invention

The present invention can provide an injection molded article comprising a thermoplastic resin composition comprising a thermoplastic resin and a filler, and having sufficiently reduced strip-like unevenness in a weld and consistent sharpness.

The present invention also can provide an injection molded article comprising a thermoplastic resin composition comprising a thermoplastic resin and a colored metallic pigment, and having sufficiently reduced strip-like unevenness in the weld, consistent brightness in the entire surface of the injection molded article, and a luxurious and deep metallic color tone.

DESCRIPTION OF EMBODIMENT

Figure 1:
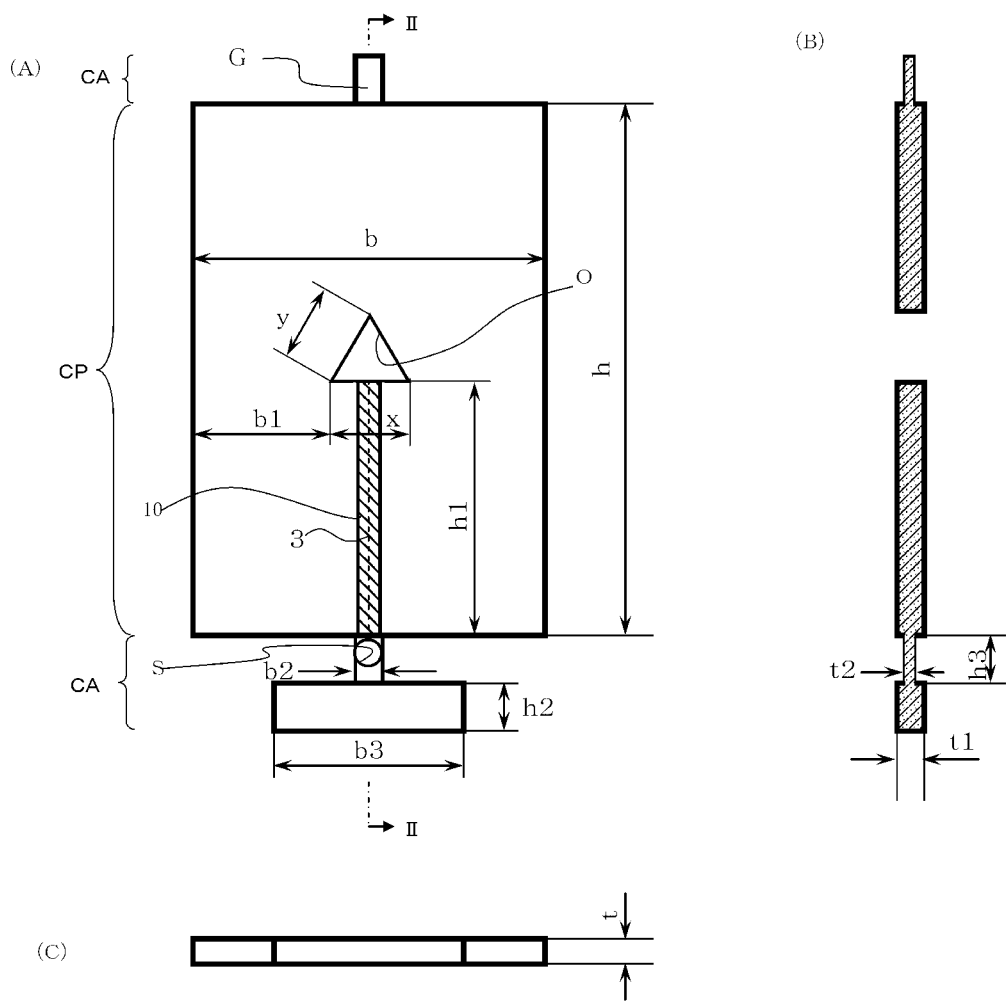
FIG. 1 is a schematic view showing an example of an injection molded article according to the present invention.

Hereinafter, an embodiment for implementing the present invention (hereinafter, simply referred to as "the present embodiment") will be described in detail in reference with the drawings when necessary. In the drawings, same reference numerals will be given to same components, and duplication of description will be omitted. Positional relationships such as up, down, left, and right are based on positional relationships shown in the drawings unless otherwise specified. Further, dimensional ratios in the drawings will not be limited to ratios shown in the drawings.

The injection molded article according to the present embodiment is an injection molded article obtained by injection molding a thermoplastic resin composition comprising (A) 100 parts by mass of a thermoplastic resin and (B) 50 parts by mass or less of a filler, wherein at least one weld exists, and a long diameter of 95% by mass or more of the filler existing within a cross-sectional depth of 50 μm or less from a surface of the weld is parallel to the surface of the weld.

As the (A) thermoplastic resin used in the present embodiment, thermoplastic resins usually known can be used. Examples of the thermoplastic resins include olefin resins such as polyethylenes and polypropylenes; styrene resins such as GPPS (polystyrene), HIPS (high impact polystyrene), MS resins (methyl methacrylate•styrene copolymers), MBS resins (methyl methacrylate•butadiene•styrene copolymers), MAS resins (methyl methacrylate•acrylonitrile•styrene copolymers), AS resins (acrylonitrile•styrene copolymers), ABS resins (acrylonitrile•butadiene•styrene copolymers), ASA resins (acrylonitrile•acrylate•styrene copolymers), AES resins (acrylonitrile•EPDM•styrene copolymers), and ACS resins (acrylonitrile•chlorinated polyethylene•styrene copolymers); ester resins such as polyethylene terephthalate, polybutylene terephthalate, and polytrimethylene terephthalate; and other resins such as PMMA (polymethyl methacrylate), polycarbonate, vinyl chloride resins, polyamide, polyacetal, modified polyphenylene ether, polyurethane, polysulfone, polyether ketone, polyether sulfone, polyether sulfone, fluorinated resins, silicone resins, styrene elastomers, olefin elastomers, polyester elastomers, polycaprolactone, aromatic polyester elastomers, and polyamide elastomers. These (A) thermoplastic resins are used alone, or used in combination by mixing.

Among these, the thermoplastic resin preferably contains a non-crystalline resin from the viewpoint of moldability, and preferably contains a styrene resin obtained by polymerizing an aromatic vinyl monomer alone or by polymerizing a monomer mixture containing an aromatic vinyl monomer. Examples of the non-crystalline resins include styrene resins, acrylic resins, polycarbonate resins, and polyphenylene ether resins. These non-crystalline resins are used alone or in combination.

The monomer mixture can contain the aromatic vinyl monomer and other monomer copolymerizable with the aromatic vinyl monomer. Examples of the other monomers include unsaturated nitrile monomers, unsaturated carboxylic acid alkyl ester monomers, and maleimide monomers. These are preferable from the viewpoint of easy copolymerization with the aromatic vinyl monomer. These other monomers are used alone or in combination. The monomer mixture may contain a compound that becomes a precursor of the aromatic vinyl monomer or the other monomer. Prior to the polymerization or during the polymerization, the compound may be converted into the aromatic vinyl monomer or the other monomer.

Examples of the aromatic vinyl monomer include styrene, α-methylstyrene, o-methylstyrene, p-methylstyrene, o-ethylstyrene, p-ethylstyrene, and p-t-butylstyrene. Among these, styrene and α-methylstyrene are preferable from the viewpoint of general versatility of the monomer. These aromatic vinyl monomers are used alone or in combination.

Examples of the unsaturated nitrile monomers include acrylonitrile, methacrylonitrile, and ethacrylonitrile. Among these, acrylonitrile is preferable from the viewpoint of easy copolymerization with the aromatic vinyl monomer. These are used alone, or used in combination by mixing.

Examples of the unsaturated carboxylic acid alkyl ester monomers include alkyl methacrylates such as methyl methacrylate, cyclohexyl methacrylate, methylphenyl methacrylate, and isopropyl methacrylate, and alkyl acrylate such as methyl acrylate, ethyl acrylate, butyl acrylate, and 2-ethylhexyl acrylate. Among these, methyl methacrylate, ethyl acrylate, butyl acrylate, and 2-ethylhexyl acrylate are preferable, and butyl acrylate and methyl methacrylate are more preferable from the viewpoint of easy copolymerization with the aromatic vinyl monomer. These are used alone, or used in combination by mixing.

Examples of the maleimide monomers include N-phenylmaleimide and N-methylmaleimide. These are used alone, or used in combination by mixing.

The styrene resin preferably contains a graft copolymer obtained by graft polymerizing a monomer mixture containing an aromatic vinyl monomer with a rubber-like polymer from viewpoint of impact resistance.

From the viewpoint of the impact resistance, preferable rubber-like polymers are those having a glass transition temperature of 0° C. or less. Examples of the rubber-like polymers specifically include diene rubbers such as polybutadiene, styrene-butadiene copolymerized rubbers, and acrylonitrile-butadiene copolymerized rubbers; acrylic rubbers such as polybutyl acrylate; and polyisoprene, polychloroprene, ethylene-propylene rubbers, ethylene-propylene-diene ternary copolymerized rubbers, silicone rubbers, styrene-butadiene block copolymerized rubbers, styrene-isoprene block copolymerized rubbers, silicon-acrylic composite rubbers, and hydrogenated products thereof. These are used alone, or used in combination by mixing. Among these rubber-like polymers, polybutadiene, styrene-butadiene copolymerized rubbers, acrylonitrile-butadiene copolymerized rubbers, and polybutyl acrylate are preferable from the viewpoint of easy graft polymerization.

Examples of a method for graft polymerization include emulsion polymerization, suspension polymerization, bulk polymerization, solution polymerization, and a combination thereof. Specifically, examples of the graft polymerization include emulsion graft polymerization in which a monomer mixture is graft polymerized with a rubber-like polymer latex produced by emulsion polymerization. A method of feeding the rubber-like polymer and the monomer mixture in the graft polymerization may be any method of continuous feeding, batch feeding, and semi-batch feeding. The proportion of a component grafted to the rubber-like polymer, which is produced in the process to produce the graft copolymer (hereinafter, also referred to as a "graft component") is preferably 10 to 80 parts by mass, more preferably, 20 to 60 parts by mass based on 100 parts by mass of the rubber-like polymer from the viewpoint of the impact resistance. The graft polymer produced by the graft polymerization may be obtained as a mixture with a sub-produced vinyl copolymer (in the copolymer of the rubber-like polymer and the aromatic vinyl monomer, a copolymer other than the graft copolymer). In the mixture, insoluble matter not soluble in acetone is the graft copolymer, and soluble matter soluble in acetone is the vinyl copolymer. Accordingly, the proportion of the graft component can be determined by subtracting the proportion of the rubber-like polymer as the raw material from the insoluble matter.

From the viewpoint of the appearance, the (A) thermoplastic resin used in the present embodiment preferably contains a crystalline resin, more preferably contains the non-crystalline resin and a crystalline resin, and still more preferably contains the styrene resin and a crystalline resin. The crystalline resin here means a resin having at least a crystal structure. Examples of the crystalline resin include polyethylene, polypropylene, polyethylene terephthalate, polybutylene terephthalate, polytrimethylene terephthalate, polyamide, and polyacetal. These are used alone, or used in combination by mixing. Among these, polyethylene terephthalate, polybutylene terephthalate, polytrimethylene terephthalate, and polyamide are preferable from the viewpoint of compatibility with the styrene resin.

In mixing the styrene resin with the crystalline resin, an additional compatibilizer may be blended, considering compatibility thereof. The compatibilizer depends on the resin in combination. For example, in the case where the styrene resin is mixed with polyamide, use of a maleic acid-containing resin is preferable from the viewpoint of compatibility with the styrene resin. Examples of the maleic acid-containing resin specifically include styrene-maleic acid copolymers, styrene-methyl methacrylate-maleic acid copolymers, and styrene-N-phenylmaleimide-maleic acid copolymers. These are used alone, or used in combination by mixing.

The ratio of the non-crystalline resin in the (A) thermoplastic resin is preferably 0 to 70% by mass, and more preferably 0 to 50% by mass from the viewpoint of surface sink marks. In other words, the ratio of the crystalline resin (also including the styrene resin having crystallinity) in the (A) thermoplastic resin is preferably 30 to 100% by mass, and more preferably 50 to 100% by mass.

Examples of the (B) filler used in the present embodiment include metal oxides, metal hydroxides, metal carbonates, metal sulfuric acid salts, metal silicic acid salts, carbon, organic materials mainly including cellulose, and metal fibers.

Examples of the metal oxides include silica, alumina, titanium oxide, calcium oxide, magnesium oxide, zinc oxide, iron oxide, antimony oxide, tin oxide, and diatomite. Examples of the hydroxides include calcium hydroxide, magnesium hydroxide, and aluminum hydroxide. Examples of the metal carbonates include calcium carbonate, magnesium carbonate, zinc carbonate, barium carbonate, and hydrotalcite. Examples of the metal sulfuric acid salts include calcium sulfate and barium sulfate. Examples of the metal silicic acid salts include calcium silicate (wollastonite, xonotlite), talc, mica, clay, montmorillonite, bentonite, activated clay, sepiolite, imogolite, sericite, glass fibers, glass beads, silica balloons, and glass flakes. Examples of the carbon include carbon black, graphite, carbon fibers, carbon balloons, and charcoal powder. Examples of the organic materials mainly including cellulose include wood powder, pulp, chaff powder, walnut powder, and paper sludge. Among these, those having an aspect ratio more than 1 are preferable from the viewpoint of strength. For example, calcium silicate, talc, glass fibers, carbon fibers, and wood powder are preferable. Herein, the "aspect ratio" means a ratio of the long diameter of the filler or colored metallic pigment to the short diameter thereof. For example, in the case where the filler or colored metallic pigment is fibrous, the long diameter is the length of the fiber, and the short diameter is the diameter of the fiber. In the case where the filler or colored metallic pigment is scale-like or plate-like, the long diameter is the length of the scale or plate, and the short diameter is an average thickness of the scale or plate. In the case where the filler or colored metallic pigment is spherical, the long diameter and the short diameter are the diameters of the sphere.

The mass average particle size of the filler is preferably 1 to 500 µm from the viewpoint of the impact resistance. The mass average particle size is measured by arbitrarily selecting 50 fillers, and observing these with a variety of microscopes.

These fillers are used alone, or used in combination by mixing.

The (B) filler according to the present embodiment preferably contains a colored metallic pigment. Here, the colored metallic pigment means those blended with the resin composition to reflect light and improve the brightness of the resin composition. Examples of the colored metallic pigment include micas, aluminum pigments, and metal-coated glass. Examples of the micas include natural micas or synthetic micas. Examples of natural micas include muscovite, biotite, and phlogopite. The micas may be coated with a metal oxide. In this case, examples of the metal oxide include titanium oxide, iron oxide, and zinc oxide. Among these, titanium oxide is preferable from the viewpoint of the brightness. The titanium oxide may be any of an anatase type and a rutile type. From the viewpoint of the stability to the resin, the rutile type is preferable. The metal oxide coating rate of the mica is preferably 20 to 50% by mass, and more preferably 20 to 45% by mass based on the total amount of the mica from the viewpoint of the brightness. As a method for producing mica, a production method usually known (for example, the method described in Japanese Patent Application Laid-Open No. 10-279828) may be used.

The average particle size of the mica is preferably 2 to 200 μm, and more preferably 5 to 100 μm from the viewpoint of the impact resistance. The aspect ratio of the mica is preferably 2 to 2000, and more preferably 5 to 1000 from the viewpoint of the strength. Herein, the "aspect ratio" means the ratio of the long diameter of the colored metallic pigment to the short diameter thereof. For example, in the case where the colored metallic pigment is fibrous, the long diameter is the length of the fiber, and the short diameter is the diameter of the fiber. In the case where the colored metallic pigment is scale-like or plate-like, the long diameter is the length of the scale or plate, and the short diameter is an average thickness of the scale or plate. In the case where the colored metallic pigment is spherical, the long diameter and the short diameter are the diameters of the sphere.

The aluminum pigment is a pigment produced using mainly an aluminum having high purity and having brightness. Examples of the shape of the aluminum pigment include flake-like shapes such as a scale-like shape and a plate-like shape, and polyhedral shapes. As a method for producing an aluminum pigment, a production method usually known may be used. For example, the aluminum pigment may be produced by grinding and polishing an aluminum powder or aluminum foil in a ball mill or the like containing mineral spirit and stearic acid or oleic acid. The average particle size of the aluminum pigment is preferably 0.05 to 200 μm, and more preferably 0.1 to 100 μm from the viewpoint of the impact resistance. The aspect ratio of the aluminum pigment is preferably 3 to 200, and more preferably 10 to 100 from the viewpoint of the strength.

The metal-coated glass is a glass produced by coating flake-like glass as a base material with a metal oxide. The flake-like glass means thin plate-like or scale-like fine glass powders. Examples of the coating metal oxide include titanium oxide and iron oxide. From the viewpoint of the brightness, titanium oxide is preferable. The titanium oxide may be any of an anatase type and a rutile type. From the viewpoint of the stability to the resin, the rutile type is preferable. The metal-coated glass can adjust the reflecting color tone by controlling the thickness of the coating metal oxide. Specifically, if the average coating thickness of the metal oxide is 40 to 60 nm, a color tone of white is obtained. At an average coating thickness of 60 to 80 nm, a color tone of yellow is obtained. At an average coating thickness of 80 to 100 nm, a color tone of red is obtained. At an average coating thickness of 100 to 130 nm, a color tone of blue is obtained. As a method for coating a flake-like glass with a metal oxide, a production method usually known may be used. Examples of the method include a sputtering method, a sol-gel method, a chemical vapor deposition method, and a liquid phase deposition method.

The average particle size of the metal-coated glass is preferably 5 to 600 μm, and more preferably 75 to 125 μm from the viewpoint of the impact resistance. The aspect ratio is preferably 2 to 60, and more preferably 3 to 20 from the viewpoint of the strength.

These colored metallic pigments are used alone or in combination.

The aspect ratio of the colored metallic pigment is preferably 2 or more from the viewpoint of the brightness, and preferably 600 or less from the viewpoint of suppressing reduction in the various physical properties.

The average particle size of the colored metallic pigment is measured by arbitrarily selecting 50 particles of the colored metallic pigment, and observing these with a variety of microscopes.

In the present embodiment, 50 parts by mass or less of the (B) filler is preferably contained based on (A) 100 parts by mass of the thermoplastic resin. As long as the filler is contained in the thermoplastic resin composition, the lower limit of the proportion of the filler to be contained is not particularly limited. A preferable proportion of the filler to be contained is 5 parts by mass or more because the effect of the present invention of making the long diameter of the filler parallel to the surface of the weld can be more effectively and surely obtained. The proportion of the filler to be contained is more preferably 5 to 45 parts by mass, and still more preferably 5 to 30 parts by mass based on 100 parts by mass of the thermoplastic resin. The proportion of the filler to be contained is preferably 5 parts by mass or more from the viewpoint of an effect of reinforcing physical properties, and preferably 50 parts by mass or less from the viewpoint of the sharpness.

In the present embodiment, in the case where the injection molded article contains the colored metallic pigment, 0.1 to 20 parts by mass of the colored metallic pigment is preferably contained based on 100 parts by mass of the (A) thermoplastic resin. The proportion of the colored metallic pigment to be contained is more preferably 0.2 to 10 parts by mass, and still more preferably 0.3 to 8 parts by mass based on 100 parts by mass of the (A) thermoplastic resin. The proportion of the colored metallic pigment to be contained is preferably 0.1 parts by mass or more from the viewpoint of the brightness, and preferably 20 parts by mass or less from the viewpoint of suppressing reduction in the variety of physical properties.

In the present embodiment, the injection molded article may contain both of the colored metallic pigment and the filler other than the colored metallic pigment, or may contain one of these.

In the injection molded article according to the present embodiment, at least one weld exists. The "weld" in the present embodiment means a portion produced by flows of the thermoplastic resin composition comprising a resin molten inside of the mold cavity that merge and fuse together inside of a mold cavity. The forms of merging the flows of the resin composition and the position of the weld in the injection molded article are not particularly limited.

FIG. 1 is a schematic view showing an example of the injection molded article according to the present embodiment, in which (A) in FIG. 1 is a schematic plan view of the injection molded article, (B) in FIG. 1 is a sectional view taken along the II-II line in (A) in FIG. 1, and (C) in FIG. 1 is a schematic front view. When the injection molded article shown in FIG. 1 is obtained by injection molding using a mold, the thermoplastic resin composition comprising a molten resin is introduced from a gate (corresponding to a portion indicated by referential numeral G in FIG. 1) into the mold cavity, and flows toward a shut-off valve (corresponding to a portion indicated by referential numeral S in FIG. 1). The injection molded article has an opening O provided to penetrate in its thickness direction. The flow of the thermoplastic resin composition is divided at a portion corresponding to the opening inside of the mold cavity. The divided flows pass through the opening, and merge together to form a weld 3. The weld may be a weld other than that shown in FIG. 1. For example, the weld may be a weld caused by presence of uneven thickness and a weld caused by several gates provided.

The position of the weld existing can be determined as follows. First, the weld is the portion produced by the flows of the thermoplastic resin composition that merge and fuse, as described above. Accordingly, the position of the weld can be approximately known from the shape of the mold, the position of the gate, and the position of the shut-off valve. In the case where the weld line is found in the injection molded article, a weld exists under the weld line. In the case where no weld line is found on the surface of the molded article, the position of the weld can be determined from the shape of the mold and the position of the gate. In this case, it is difficult to precisely determine the position of the weld existing. Accordingly, in the present embodiment, the position of the weld existing may be defined as a region within the width of 7 mm around an assumed weld line (for example, a region 10 expressed by an oblique line in FIG. 1) and in the depth direction.

Figure 5:
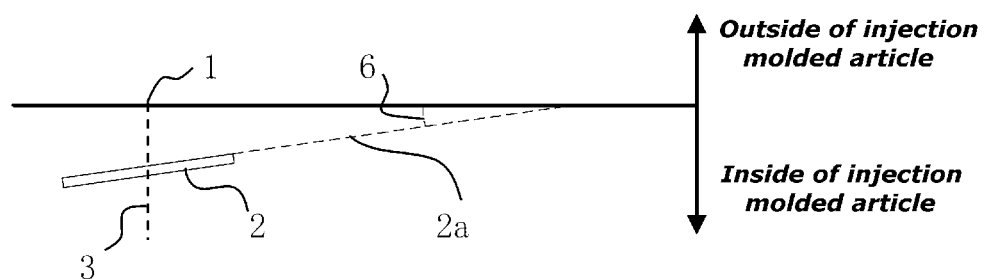
FIG. 5 is a schematic view for describing an angle made by the surface of the injection molded article and a long diameter of the filler.
Figure 6:
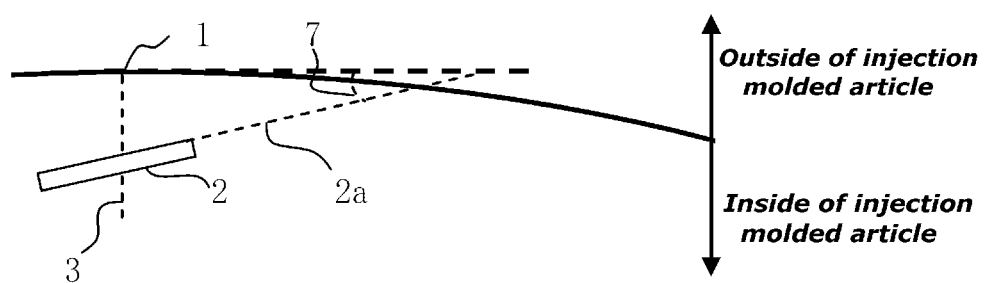
FIG. 6 is a schematic view for describing an angle made by the surface of the injection molded article and a long diameter of the filler.

In the injection molded article according to the present embodiment, the long diameter of the filler is parallel to the surface of the weld in 95% by mass or more of the filler existing within the cross-sectional depth of 50 μm or less from the surface of the weld. Herein, "parallel" includes not only the case where the angle made by the surface of the weld and the long diameter of the filler is 0°, but also the case where the angle is −10 to +10°. FIGS. 5 and 6 are schematic views for describing an example of the angle. In FIG. 5, referential numeral 6 designates the angle made by the surface of the weld on a surface 1 of the injection molded article and the long diameter 2a of the filler 2. In FIG. 6, referential numeral 7 designates the angle made by the surface of the weld on a surface 1 of the injection molded article and the long diameter 2a of the filler 2. As shown in FIG. 6, in the case where the injection molded article has a curved surface, the filler may be parallel to the tangent of the surface of the molded article located at the shortest distance from the filler (centroid thereof). The angle made by the surface of the weld and the long diameter of the filler is preferably −8 to +8°, and more preferably −5 to +5°. At an angle within the range above, the injection molded article has high sharpness, and the flow unevenness (strip-like unevenness) of the thermoplastic resin composition is difficult to find visually. In the case where the filler is the colored metallic pigment, an angle within the range above leads to a smaller difference in orientation of the colored metallic pigment between the weld portion and a portion other than that. Accordingly, the strip-like unevenness is suppressed, and a poor appearance is difficult to occur.

Figure 2:
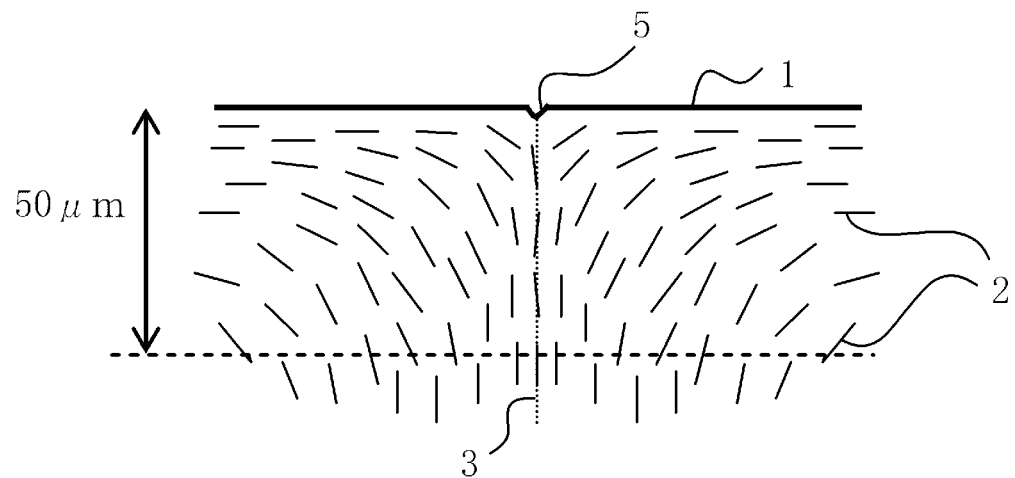
FIG. 2 is a schematic view for describing a cross-sectional depth in the injection molded article.
Figure 3:
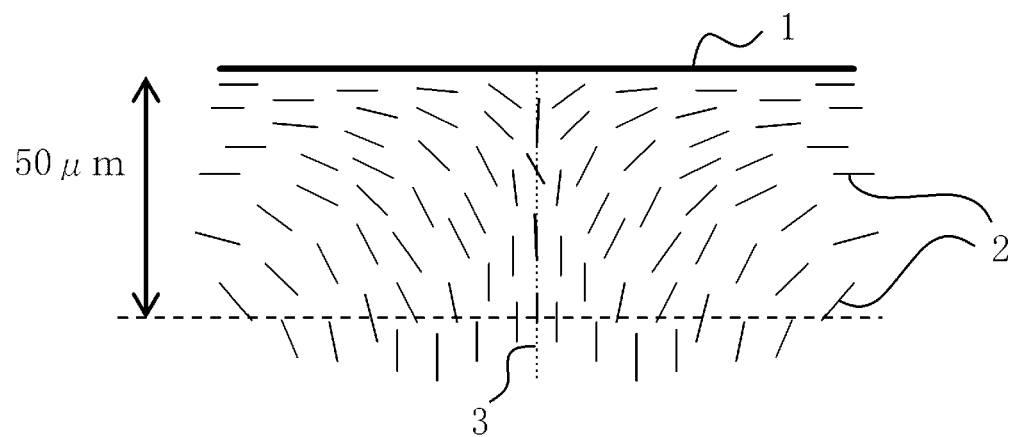
FIG. 3 is a schematic view for describing a cross-sectional depth in the injection molded article.
Figure 4:
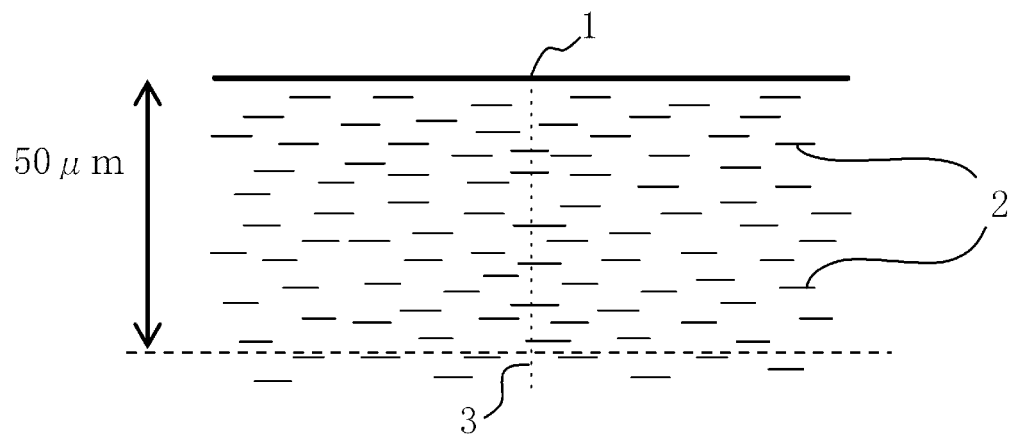
FIG. 4 is a schematic view for describing a cross-sectional depth in the injection molded article.

The expression "within the cross-sectional depth of 50 μm or less from the surface of the weld" means within the cross-sectional depth of 50 μm or less from the weld surface in the injection molded article, as shown in the schematic sectional views in FIGS. 3 and 4, for example, if the surface of the injection molded article has no dent attributed to the weld. Meanwhile, in the case where the surface of the injection molded article has a dent 5 attributed to the weld as shown in the schematic sectional view in FIG. 2, it means within the cross-sectional depth of 50 μm or less from the surface of the injection molded article in the vicinity of the dent 5 in which no dent attributed to the weld is found. Among these drawings, only FIG. 4 shows the case where the long diameter of the filler is parallel to the surface of the weld in 95% by mass or more of the filler existing within the cross-sectional depth of 50 μm or less from the surface of the weld. In the present embodiment, the long diameter of the filler is parallel to the surface of the weld preferably in 95% by mass or more of the filler existing within the cross-sectional depth of 100 μm or less from the surface of the weld, and more preferably in 95% by mass or more of the filler existing within the cross-sectional depth of 150 μm or less from the surface of the weld. If the long diameter of the filler is parallel to the surface of the weld in 95% by mass or more of the filler existing within the cross-sectional depth of 50 μm or less from the surface of the weld, the flow unevenness (strip-like unevenness) is suppressed, and a poor appearance is difficult to occur.

Preferably, the injection molded article according to the present embodiment is obtained by injection molding the thermoplastic resin composition under the temperature condition in which the difference between the mold temperature and the temperature of the thermoplastic resin composition is 0 to 60° C. By performing the injection molding as above, the injection molded article according to the present embodiment can be obtained. The "mold temperature" here means the surface temperature of the mold cavity. The "temperature of the thermoplastic resin composition" means the temperature of the thermoplastic resin composition to be injected into the mold cavity (hereinafter, the temperature is simply referred to as a "resin temperature"). The mold temperature and the resin temperature may be values measured by a usually known thermometer. Use of the same thermometer is preferable because the difference between these temperatures is checked. As a specific method, for example, the mold temperature is defined as a measured value obtained by measuring the surface temperature inside of the mold cavity using a contact type thermometer, and the resin temperature is defined as a measured value obtained by measuring the thermoplastic resin composition containing a molten resin and injected from the nozzle of an injection molding machine using the contact type thermometer.

The difference between the mold temperature and the resin temperature is preferably 0 to 60° C., more preferably 0 to 50° C., and still more preferably 0 to 45° C. If the difference between the mold temperature and the resin temperature is 0 to 60° C., the fountain flow is difficult to occur when the thermoplastic resin composition flows inside of the mold cavity. Accordingly, a skin layer of the resin contacting the wall surface of the mold cavity is difficult to form. Thereby, the filler is likely to orient parallel to the surface of the injection molded article also in the weld portion. Moreover, the filler is likely to uniformly disperse.

The resin temperature is preferably within a temperature range suitable for the thermoplastic resin to be selected. In the case where the thermoplastic resin contains the crystalline resin, the resin temperature is preferably a temperature 20 to 100° C. higher than the melting point of the crystalline resin. In the case where the thermoplastic resin contains the non-crystalline resin, the resin temperature is preferably a temperature 60 to 200° C. higher than the glass transition temperature of the non-crystalline resin. In the case where the thermoplastic resin contains the crystalline resin, the mold temperature is preferably a temperature 20° C. or more higher than the melting point of the crystalline resin. In the case where the thermoplastic resin contains the non-crystalline resin, the mold temperature is preferably a temperature 60° C. or more higher than the glass transition temperature of the non-crystalline resin. If the resin temperature or the mold temperature is within the temperature range above, the flow unevenness (strip-like unevenness) is suppressed, a poor appearance is difficult to occur, and the effect of improving weld strength is obtained. Particularly in the case where the filler contains the colored metallic pigment, the distance from the surface of the injection molded article to the colored metallic pigment existing inside thereof is longer, and a luxurious and deep metallic color tone is likely to be obtained. More specifically, if the distance from the surface of the injection molded article to the colored metallic pigment is longer, the deep metallic color tone is obtained by transmission and reflection of light as if an additional resin layer is applied onto the injection molded article.

According to the present embodiment, by adjusting the difference between the mold temperature and the resin temperature to be 0 to 60° C., the fountain flow in the weld can be more suppressed than in the related art. The "fountain flow" here means that the thermoplastic resin composition flows as if it erupted to the wall surface of the mold from the flow center, not that the thermoplastic resin composition flows inside of the mold cavity by sliding on the wall surface of the mold. If the fountain flow occurs and the resin contacts the wall surface of the mold, the resin is quickly cooled by the mold to form a skin layer (solidified layer). In the present embodiment, the fountain flow in the weld is more suppressed than in the related art. This can make the long diameter of the filler parallel to the surface of the weld in 95% by mass or more of the filler existing within the cross-sectional depth of 50 μm or less from the surface of the weld.

Preferably, the injection molded article according to the present embodiment is obtained by the injection molding using a mold having a product cavity and a spillover cavity located downstream, in the flow direction of the thermoplastic resin composition, of the product cavity. Here, the "product cavity" refers to a portion of the mold cavity for molding a portion of the injection molded article used as a product (for example, the portion indicated by referential numeral CP in (A) in FIG. 1), which is provided separately from the gate or the like. Meanwhile, the "spillover cavity" refers to a portion of the mold cavity in which the injection molded article is molded but not used as a product (for example, the portion indicated by referential numeral CA in (A) in FIG. 1). The side downstream in the flow direction is more preferably a region close to the leading end of the flow and the complete leading end of the flow. Specifically, the side downstream in the flow direction is preferably the region of 10 cm or less, and more preferably the region of 5 cm or less from the leading end of the flow in the flow direction. Existence of the spillover cavity enables the thermoplastic resin composition merging in the weld to further flow to the spillover cavity. This can improve the flow unevenness produced in the vicinity of the weld, leading to further suppression in the strip-like unevenness.

The injection molded article according to the present embodiment can contain one or more colorants selected from the group consisting of dyes and pigments in addition to the (B) filler.

Examples of the dyes include azo dyes, anthraquinone dyes, indigoid dyes, sulfur dyes, triphenylmethane dyes, pyrazolone dyes, stilbene dyes, diphenylmethane dyes, xanthene dyes, alizarin dyes, acridine dyes, quinoneimine dyes (azine dyes, oxazine dyes, thiazine dyes), thiazole dyes, methine dyes, nitro dyes, and nitroso dyes. These are used alone, or used in combination by mixing.

Examples of the pigments include organic pigments and inorganic pigments. Among these, examples of the organic pigments include natural organic pigments and synthetic organic pigments. Examples of the natural organic pigments include botanical pigments, animal pigments, and mineral pigments. Examples of the synthetic organic pigments include dye lake pigments, soluble azo pigment, insoluble azo pigments, condensation azo pigments, azo complex salt pigments, phthalocyanine pigments, condensation polycyclic pigments, and fluorescent pigments. Examples of the inorganic pigments include natural inorganic pigments and synthetic inorganic pigments. Examples of the natural inorganic pigments include earth pigments, burned earth pigments, and mineral pigments. Examples of the synthetic inorganic pigments include oxide pigments, hydroxide pigments, sulfide pigments, silicic acid salt pigments, phosphoric acid salt pigments, carbonate pigments, metal powder pigments, and carbon pigments. These pigments are used alone, or used in combination by mixing.

Among these colorants, use of these dyes alone or a combination of these dyes and synthetic organic pigments is preferable from the viewpoint of color developability.

The injection molded article according to the present embodiment can contain other compounding agents and additives usually contained in the thermoplastic resin composition such as a lubricant, an ultraviolet absorbing agents, a light fastening agent, an antistatic agent, an antioxidant, a flame retardant, and a foaming agent when necessary. Among these, considering the case where the injection molded article is used without coating, the injection molded article preferably contains a lubricant, an ultraviolet absorbing agent, and a light fastening agent.

Examples of the lubricant include fatty acid metal salts and those having an amide group or an ester group. These are used alone or in combination. The fatty acid metal salts are fatty acid salts of one or more metals selected from the group consisting of sodium, magnesium, calcium, aluminum, and zinc, for example. From the viewpoint of affinity with the thermoplastic resin, the fatty acid metal salts are preferably sodium stearate, magnesium stearate, calcium stearate, aluminum (mono-, di-, or tri-) stearate, zinc stearate, sodium montanate, calcium montanate, calcium ricinoleate, and calcium laurate, and more preferably sodium stearate, magnesium stearate, calcium stearate, and zinc stearate. Examples of the lubricants having an amide group or an ester group include at least one selected from the group consisting of ethylene bisstearylamide, montanic acid, and wax derived from montanic acid. Examples of the wax derived from montanic acid include montanic acid ester waxes, montanic acid partially saponified ester waxes, lithium montanate, zinc montanate, and a mixture of a wax selected from these with montanic acid. From the viewpoint of effectively and surely providing the effect and not inhibiting the effect of other component, the amount of the lubricant to be blended is preferably 0.05 to 10 parts by mass, and more preferably 0.1 to 5 parts by mass based on 100 parts by mass of the (A) thermoplastic resin.

Examples of the ultraviolet absorbing agent include benzotriazole ultraviolet absorbing agents, benzophenone ultraviolet absorbing agents, salicylate ultraviolet absorbing agents, cyanoacrylate ultraviolet absorbing agents, triazine ultraviolet absorbing agents, oxanilide ultraviolet absorbing agents, nickel complex salt ultraviolet absorbing agents, and inorganic ultraviolet absorbing agents. Those usually blended in the thermoplastic resin composition can be used. Among these, from the viewpoint of an effect of absorbing ultraviolet light, benzotriazole ultraviolet absorbing agents, benzophenone ultraviolet absorbing agents, cyanoacrylate ultraviolet absorbing agents, and triazine ultraviolet absorbing agents are preferable, and benzotriazole ultraviolet absorbing agents and benzophenone ultraviolet absorbing agents are more preferable. These are used alone or in combination. From the viewpoint of effectively and surely providing the effect and not inhibiting the effect of other component, the amount of the ultraviolet absorbing agent to be blended is preferably 0.01 to 5 parts by mass based on 100 parts by mass of the (A) thermoplastic resin.

As the light fastening agent, amine light fastening agents are preferable, and hindered amines are more preferable from the viewpoint of an effect of suppressing cut of the molecule by radicals. These are used alone or in combination. From the viewpoint of effectively and surely providing the effect and not inhibiting the effect of other component, the amount of the light fastening agent to be blended is preferably 0.01 to 10 parts by mass based on 100 parts by mass of the (A) thermoplastic resin.

The thermoplastic resin composition used in the present embodiment can be produced using a variety of mixing apparatuses usually used for production of the thermoplastic resin composition such as a single or twin screw extruder with a vent, a Plastomill, a kneader, a Banbury mixer, and a Brabender. Among these, a twin screw extruder with a vent is preferably used for production of the thermoplastic resin composition from the viewpoint of dispersibility of the resin composition.

The injection molded article according to the present embodiment is molded by injection molding. As the injection molding method, an ordinary injection molding method used for molding a thermoplastic resin can be used. Specifically, examples of the method include foaming injection molding, injection compression molding, a gas-assist molding method using nitrogen gas or carbon dioxide gas, and a heat cycle molding method performed at a high mold temperature. These can be used alone or in combination. Among these, foaming injection molding, gas-assist molding, heat cycle molding, and a combination of gas-assist molding and heat cycle molding are preferable.

The gas-assist molding here refers to the injection molding usually known and using nitrogen gas or carbon dioxide gas. More specifically, examples of the gas-assist molding include a method in which a resin is injected into a mold cavity, and a pressurized gas is injected into a molded article, as described in Japanese Patent Publication No. 57-14968, for example; a method in which a resin composition is injected into a mold cavity, and a pressurized gas is pressed into a cavity corresponding to one surface of a molded article, as described in Japanese Patent No. 3819972, for example; and a method in which a thermoplastic resin is filled with a gas in advance, and is molded, as described in a method according to Japanese Patent No. 3349070, for example. Among these, the method of pressing a pressurized gas into a cavity corresponding to one surface of a molded article is preferable.

In the present embodiment, in order to keep pressure constant to prevent sink marks and warpage, use of the gas-assist molding is preferable. In the case where keeping pressure constant to prevent sink marks and warpage is performed with a resin, the mold temperature becomes relatively high. This is likely to cause flash. This also tends to increase the pressure keeping time to prevent sink marks and warpage.

The injection molded article according to the present embodiment is preferably used as products seen by people. Examples of such products include automobile interior and exterior parts such as a door handle, switches, covers, and garnishes; parts and remote controllers for electronic and electrical apparatuses such as copiers, multifunction machines, personal computers, a mouse, mobile phones, and game machines; household electrical appliance parts such as air conditioners, TV sets, refrigerators, electronic ovens, electronic pots, and telephones; and house equipment parts such as kitchen modules, bath modules, sinks, toilet units, electric meters, and switchboards. Among these, casings for automobile interior parts and electrical and electronic parts are preferable. Specifically, automobile interior parts such as inner door handles, a variety of switches, and covers, and game machine casings, remote controllers, TV sets, and mobile phones are preferable.

The present embodiment can provide an injection molded article comprising a thermoplastic resin and a filler, having sufficiently reduced flow unevenness (strip-like unevenness) in the weld, consistent sharpness, and high surface impact resistance, and can provide a thermoplastic resin composition used as the raw material for the injection molded article.

The present embodiment also can provide an injection molded article comprising a thermoplastic resin and a colored metallic pigment, and having no flow unevenness in the weld, consistent brightness on its entire surface, and a luxurious and deep metallic color tone.

EXAMPLES

Examples and Comparative Examples below are intended to more specifically describe the present invention. The present invention will not be limited to Examples and Comparative Examples below. Raw materials used are as follows.

1. Raw Materials Used in Examples and Comparative Examples

<(A) Thermoplastic Resin>

(A-1) 140 parts by mass of a polybutadiene rubber latex (mass average particle size measured using a microtrack particle size analyzer "nanotrac 150" (trade name) manufactured by NIKKISO CO., LTD.: 0.31 μm, solid content: 50 parts by mass, swell index: 40%), 0.075 parts by mass of tert-dodecylmercaptan, and 5 parts by mass of deionized water were placed in a polymerization reaction tank. A gaseous phase was replaced by nitrogen, and the temperature was raised to 50° C. Subsequently, while the temperature was raised to 65° C. over 1 hour, a monomer mixed solution (monomer mixture) comprising 13.5 parts by mass of acrylonitrile, 36.5 parts by mass of styrene, 0.25 parts by mass of tert-dodecylmercaptan, and 0.1 parts by mass of cumene hydroperoxide, and an aqueous solution prepared by dissolving 0.2 parts by mass of sodium formaldehyde sulfoxylate, 0.004 parts by mass of ferrous sulfate, and 0.04 parts by mass of ethylenediaminetetraacetic acid disodium salt in 22 parts by mass of deionized water were added into the polymerization reaction tank over 4 hours. The polymerization reaction tank was controlled to be 70° C. for 1 hour since the addition was completed, and the polymerization reaction was completed.

0.067 parts by mass of a silicone resin antifoaming agent (manufactured by Shin-Etsu Chemical Co., Ltd., trade name "KM-71") and a 0.345 parts by mass of a phenol antioxidant emulsion (manufactured by Chukyo Yushi Co., Ltd., trade name "L-673") were added to 100 parts by mass of the thus-obtained ABS latex. Then, 0.7 parts by mass of a 27% aluminum sulfate aqueous solution was added to solidify the latex. Further, the latex was sufficiently dehydrated and washed with water, and dried to obtain Polymer (A-1). Here, Copolymer (a-1) was also obtained at the same time. The proportion of Polymer (A-1) was 73.4% by mass and that of Copolymer (a-1) was 26.6% by mass. According to a result of a composition analysis using a Fourier transform infrared spectrophotometer (FT-IR), the composition of the structural unit of Polymer (A-1) was 8.6% by mass of acrylonitrile, 68.1% by mass of butadiene, and 23.3% by mass of styrene. The grafting rate was 46.8%. The composition of the structural unit of Copolymer (a-1) was 27.1% by mass of acrylonitrile and 72.9% by mass of styrene, and the reduced viscosity was 0.38 dL/g.

(A-2) A mixture comprising 21 parts by mass of acrylonitrile, 47 parts by mass of styrene, 32 parts by mass of toluene as a solvent, and 0.05 parts by mass of t-butylperoxy-2-ethylhexanoate as a polymerization initiator was bubbled using nitrogen gas. Then, using a spray nozzle, the mixture after bubbling was continuously fed at a rate of 37.5 kg/h to the same reaction tank described in Example 2 in Japanese Patent No. 3664576, which included two-stage oblique paddle type (inclined angle of 45°) stirring blade and had an inner volume of 150 L. The used polymerization initiator t-butylperoxy-2-ethylhexanoate had a crosslinking efficiency $\epsilon$ of 64.

The polymerization temperature was 130° C. The same amount of the reaction solution as the amount of the solution to be fed was continuously extracted to keep the filling rate of the reaction solution inside of the reaction tank at 70% by volume. A jacket for adjusting the temperature was provided in a portion corresponding to the liquid phase in the reaction tank. The jacket temperature was 128° C. The power needed for stirring was 4 kW/m, and the polymerization conversion rate was 39.8% by mass/h.

The extracted reaction solution was introduced into a volatile content removing apparatus kept at 250° C. and high vacuum of 10 mmHg, in which a non-reacted monomer and the organic solvent were degassed and recovered. Copolymer (A-2) produced was recovered as a pellet. According to a result of a composition analysis using a Fourier transform infrared spectrophotometer (FR-IR), the composition of the structural unit of Copolymer (A-2) was 29.8% by mass of acrylonitrile and 70.2% by mass of styrene. The reduced viscosity was 0.65 dL/g.

(A-3) 150 ppm of 1,1-di-t-butylperoxy-3,3,5-trimethylcyclohexane and 1500 ppm of n-octylmercaptan were added to a monomer mixture comprising 68.6 parts by mass of methyl methacrylate, 1.4 parts by mass of methyl acrylate, and 30 parts by mass of ethylbenzene, and uniformly mixed. The solution was continuously fed to an air-tight pressure-resistant reactor having an inner volume of 10 L, and polymerized under stirring at an average temperature of 135° C. and an average residence time of 2 hours. The polymerization solution was continuously fed to a storage tank connected to the reactor. The polymer was separated from a non-reacted monomer and the solution. The polymer was continuously extruded in a molten state by an extruder to obtain a pellet of Copolymer (A-3).

The copolymer had a reduced viscosity of 0.35 dL/g. A composition analysis was performed using pyrolysis gas chromatography. The result of methyl methacrylate unit/methyl acrylate unit=98.0/2.0 (mass ratio) was obtained. Further, the amounts of lauric acid and stearyl alcohol in the pellet were determined. The result obtained was that the amount of lauric acid was 0.03 parts by mass and the amount of stearyl alcohol was 0.1 parts by mass based on 100 parts by mass of the pellet.

(A-4) polytrimethylene terephthalate manufactured by Shell Chemicals Japan Ltd., trade name "CORTERRA 9200"

(A-5) polyamide 6 manufactured by Ube Industries, Ltd., trade name "UBEnylon 1015B"

(A-6) PMMA (methyl methacrylate-styrene-maleic anhydride copolymer) manufactured by Asahi Kasei Chemicals Corporation, trade name "Delpet 980N"

(A-7) polyamide 66 manufactured by Asahi Kasei Chemicals Corporation, trade name "Leona 1300S"

(A-8) polypropylene manufactured by Prime Polymer Co., Ltd., trade name "Prime Polypro J830HV"

(A-9) polycarbonate manufactured by CHIMEI Corporation, trade name "Wonderlite PC110"

<(B) Filler>

(B-1) colored metallic pigment manufactured by Yamaishi Metal Co., Ltd., trade name "YP-2000N," aluminum flake, average particle size of 18 µm, aspect ratio of 10

(B-2) colored metallic pigment manufactured by Toyo Aluminium K.K., trade name "Alpaste 1950M," aluminum flake, average particle size of 52 µm, aspect ratio of 8

(B-3) colored metallic pigment manufactured by Merck KGaA, trade name "Iriodin 163," mica, average particle size of 180 µm, aspect ratio of 600

(B-4) talc manufactured by Matsumura Sangyo K.K., trade name "Crown Talc PP," average particle size: 8 µm, aspect ratio: 6

(B-5) alumina borosilicate glass fiber manufactured by Nippon Electric Glass Co., Ltd., trade name "ECS03 T-187," average particle size: 13 µm, aspect ratio: 230

<Others>

(X-1) Ethylene Bisstearamide Manufactured by Kao Corporation, Trade Name "Kao Wax EB-FF"

Here, the "grafting rate" is defined as a mass proportion of a component graft copolymerized with a rubber-like polymer to the rubber-like polymer. A method for deriving the grafting rate is as follows. Namely, first, the mass of the rubber-like polymer before polymerization was measured in advance. Next, the polymer produced by the polymerization reaction was dissolved in acetone, and separated into acetone-soluble matter and acetone-insoluble matter with a centrifuge. The acetone-soluble matter is a component not graft polymerized (non-graft component) in the copolymer subjected to the polymerization reaction, and the acetone-insoluble matter is the rubber-like polymer and a component graft polymerized with the rubber-like polymer (graft component). After separation, the mass of the acetone-insoluble matter was measured, and a value obtained by subtracting the mass of the rubber-like polymer from the mass of the acetone-insoluble matter is defined as the mass of the graft component. Accordingly, the grafting rate was determined from these values.

The reduced viscosity was obtained by measuring an efflux time in a Cannon-Fenske type capillary at 30° C. in a solution obtained by dissolving 0.25 g of the thermoplastic resin in 50 mL of 2-butanone. The reduced viscosity of the component not graft polymerized with the rubber-like polymer in the thermoplastic resin (non-graft component) was obtained as follows: the thermoplastic resin was dissolved in acetone; the obtained solution was separated into acetone-soluble matter and acetone-insoluble matter with a centrifuge; then, the efflux time in the Cannon-Fenske type capillary was measured at 30° C. in the solution obtained by dissolving 0.25 g of the acetone-soluble matter in 50 mL of 2-butanone.

The aspect ratio of the filler was determined by measuring a long diameter and a short diameter at arbitrary 10 places with an electron microscope, calculating the aspect ratio at each of the measured places, and further determining the arithmetic mean of these aspect ratios.

2. Method for Producing Injection Molded Article and Evaluation Method

In Examples and Comparative Examples, a method for producing an injection molded article, and evaluation and measurement methods are as follows. In production of the thermoplastic resin composition, using a twin screw extruder (trade name "ZSK-25," L/D=37, manufactured by Werner & Pfleiderer GmbH & Co. KG) as a melting and kneading apparatus, the thermoplastic resin, and the filler, and when necessary, other component were mixed in a mass ratio shown in Tables 1 to 4, and molten and kneaded on the condition of the cylinder set temperature of 250° C., the number of rotation of the screw of 150 rpm, and the kneaded resin discharging rate of 20 kg/h. Thus, thermoplastic resin compositions 1-1 to 1-14 and 2-1 to 2-8 were obtained.

Examples 1-1 to 1-23, Comparative Examples 1-1 to 1-3

Using an injection molding machine manufactured by The Japan Steel Works, Ltd. (trade name "J-100 EPI"), injection molded bodies having the shape shown in FIG. 1 (the sizes in the drawings were: h=90 mm, h1=45 mm, h2=10 mm, h3=10 mm, b=50 mm, b1=20 mm, b2=5 mm, b3=30 mm, t=2.5 mm, t1=2.5 mm, t2=1 mm, x=10 mm, y=10 mm) were produced at the resin temperature and mold temperature (mold set temperature, surface temperature of the mold cavity) shown in Tables 5 to 8, and evaluated. In Tables 5 to 8, the "mold set temperature" means the set temperature of the mold, the "mold surface temperature" means the surface temperature of the mold cavity, and the "difference between the resin temperature and mold surface temperature" means a value obtained by subtracting the surface temperature of the mold cavity from the resin temperature.

The mold enabled control up to a high temperature by providing an ordinary pipe for adjusting the temperature, and fitting an electrothermal heater and a thermocouple in the vicinity of the cavity surface of the molded article.

In Examples 1-1 to 1-12, Examples 1-15 to 1-18, and Comparative Examples 1-1 to 1-3, the mold set temperature was set at a temperature shown in Tables 5 to 8 with the electrothermal heater, and hot water at 120° C. was flowed through the pipe for adjusting the temperature to cool hot water. At a stage where the surface temperature of the mold cavity was stabilized, the shut-off valve was opened to inject the resin composition. At this time, the power supply of the electrothermal heater was turned off, and cooling was started. After cooling, the obtained injection molded article was taken out, and subjected to various evaluations.

In Example 1-13, the mold set temperature was set at the temperature shown in Table 7 with the electrothermal heater, and hot water at 120° C. was flowed through the pipe for adjusting the temperature to cool hot water. At a stage where the surface temperature of the mold cavity was stabilized, the shut-off valve was opened to inject the resin composition. At this time, the power supply of the electrothermal heater was turned off. After injection was completed, nitrogen gas was pressed into the mold cavity corresponding to one surface of the molded article in the same manner as in the method described in Japanese Patent No. 3819972. After cooling, the obtained injection molded article was taken out, and subjected to various evaluations.

In Example 1-14, an injection molded article was obtained in the same manner as in Example 1-1 except that the shut-off valve was closed but not opened, and the obtained injection molded article was subjected to various evaluations.

Comparative Example 1-4

Using an injection molding machine manufactured by The Japan Steel Works, Ltd. (trade name "J-100 EPI"), injection molded bodies having the shape shown in FIG. 2 (the sizes in the drawings were: h=90 mm, h1=45 mm, h4=20 mm, b=50 mm, b1=20 mm, b4=5 mm, t=2.5 mm, t3=2 mm, x=10 mm, y=10 mm) were produced at the resin temperature and mold temperature (mold set temperature, surface temperature of the mold cavity) shown in Table 8, and evaluated.

The mold enabled control up to a high temperature by providing an ordinary pipe for adjusting the temperature, and fitting an electrothermal heater and a thermocouple in the vicinity of the cavity surface of the molded article.

Two pistons were installed to enable application of pressure to the resin from the direction vertical to the weld. After filling of the resin was completed, the pistons were alternately moved in the same manner as described in Japanese Patent Laid-Open No. 2006-205571 to flow the resin in the weld. The obtained injection molded article was subjected to various evaluations. Each of the pistons was moved at least once.

1) Weld Line

The weld 3 shown in FIG. 1 and its adjacent area were visually observed from every angle. If no wedged depression could be found, it was evaluated as A. If a wedged depression could be found, it was evaluated as B. The results are shown in Tables 5 to 8.

2) Flow Unevenness (Strip-Like Unevenness)

The weld 3 shown in FIG. 1 and its adjacent area were visually observed from every angle. If no black strip or color separation could be found, it was evaluated as A. If no black strip could be found but color separation could be found at the weld 3 as a boundary, it was evaluated as B. If black strips could be partially found in the weld 3, it was evaluated as C. If black strips could be found in the entire weld 3, it was evaluated as D. The results are shown in Tables 5 to 8.

3) Brightness

The injection molded article was visually observed from every angle. If the brightness attributed to the colored metallic pigment had consistency, it was evaluated as A. If the brightness attributed to the colored metallic pigment had no consistency, it was evaluated as B. The results are shown in Tables 5 to 8.

4) Color Tone

The injection molded article was visually observed from every angle. If the color tone was a luxurious and deep metallic color tone, it was evaluated as A. If the color tone was not a luxurious and deep metallic color tone, it was evaluated as B. The results are shown in Tables 5 to 8.

5) Angle of Colored Metallic Pigment

The portion shown as 10 in FIG. 1 (the region within the width of 7 mm around the weld 3) and the portion in its depth (thickness) direction were determined as the position of the weld 3 existing. Then, in the position of the weld 3 existing, in all the colored metallic pigments existing within the cross-sectional depth of 50 μm or less from the surface of the molded article, an angle made by the long diameter of the colored metallic pigment and the surface of the injection molded article in the weld 3 (angle of the colored metallic pigment) was measured. If 95% by mass or more of the colored metallic pigment had an angle of the colored metallic pigment of −5 to 5°, it was evaluated as A. If 95% by mass or more of the colored metallic pigment had an angle of the colored metallic pigment of not less than −10° and less than −5° or more than 5° and not more than 10°, it was evaluated as B. If 95% by mass or more of the colored metallic pigment had an angle of the colored metallic pigment of less than −10° or more than 10°, it was evaluated as C. The angle of the colored metallic pigment was derived by observing the positional relationship between the colored metallic pigment and the surface with an optical microscope and measuring the positional relationship with a protractor. The numeric values of the angle of the colored metallic pigment and their evaluation results are shown in Tables 5 to 8.

6) Surface Sink Marks

The injection molded article was visually observed from every angle. If no wave could be found on the entire surface of the injection molded article, it was evaluated as A. If waves could be partially found on the surface of the injection molded article, it was evaluated as B. If waves could be found on the entire surface of the injection molded article, it was evaluated as C. The results are shown in Tables 5 to 8.

Examples 2-1 to 2-13, Comparative Examples 2-1 to 2-3

Using an injection molding machine manufactured by The Japan Steel Works, Ltd. (trade name "J-100 EPI"), injection molded bodies having the shape shown in FIG. 1 (the sizes in the drawings were: h=90 mm, h1=45 mm, h2=10 mm, h3=10 mm, b=50 mm, b1=20 mm, b2=5 mm, b3=30 mm, t=2.5 mm, t1=2.5 mm, t2=1 mm, x=10 mm, y=10 mm) were produced at the resin temperature and mold temperature (mold set temperature, surface temperature of the mold cavity) shown in Tables 9 to 11, and evaluated. In Tables 9 to 11, the "mold set temperature" means the set temperature of the mold, the "mold surface temperature" means the surface temperature of the mold cavity, and the "difference between the resin temperature and mold surface temperature" means a value obtained by subtracting the surface temperature of the mold cavity from the resin temperature.

The mold enabled control up to a high temperature by providing an ordinary pipe for adjusting the temperature, and fitting an electrothermal heater and a thermocouple in the vicinity of the cavity surface of the molded article.

In Examples 2-1 to 2-8, Example 2-11, Example 2-13, and Comparative Examples 2-1 to 2-3, the mold set temperature was set at a temperature shown in Tables 9 to 11 with an electrothermal heater, and hot water at 120° C. was flowed through the pipe for adjusting the temperature to cool hot water. At a stage where the surface temperature of the mold cavity was stabilized, the shut-off valve was opened to inject the resin composition. At this time, the power supply of the electrothermal heater was turned off, and cooling was started. After cooling, the obtained injection molded article was taken out, and subjected to various evaluations.

In Examples 2-9 and 2-10, the mold set temperature was set at a temperature shown in Table 10 with the electrothermal heater, and hot water at 120° C. was flowed through the pipe for adjusting the temperature to cool hot water. At a stage where the surface temperature of the mold cavity was stabilized, the shut-off valve was opened to inject the resin composition. At this time, the power supply of the electrothermal heater was turned off. After injection was completed, nitrogen gas was pressed into the mold cavity corresponding to one surface of the molded article in the same manner as in the method described in Japanese Patent No. 3819972. After cooling, the obtained injection molded article was taken out, and subjected to various evaluations.

In Example 2-12, an injection molded article was obtained in the same manner as in Example 2-1 except that the shut-off valve was closed but not opened. The injection molded article was subjected to various evaluations.

Among various evaluations, the weld line, flow unevenness (strip-like unevenness), and surface sink marks were evaluated in the same manner as above.

1) Sharpness

Light of a fluorescent lamp was reflected on the surface of the injection molded article. The surface of the injection molded article was visually observed from every angle. If no distortion could be found in the line of the reflected light of the fluorescent lamp, it was evaluated as A. If distortion could be found in the line of the reflected light of the fluorescent lamp, it was evaluated as B. The results are shown in Tables 9 to 11.

2) Falling Weight Impact Value

A test was performed on the injection molded article according to JIS K7211-1976, and 50% breaking energy (units: J (joules)) was derived. A steel ball was dropped approximately between the opening O and the gate G on the weld 3 of the injection molded article shown in FIG. 1. The results are shown in Tables 9 to 11.

3) Angle of Filler

The portion shown as 10 in FIG. 1 (the region within the width of 7 mm around the weld 3) and the portion in its depth (thickness) direction were determined as the position of the weld 3 existing. Then, in the position of the weld 3 existing, in all the fillers existing within the cross-sectional depth of 50 μm or less from the surface of the molded article, an angle made by the long diameter of the filler and the surface of the injection molded article in the weld 3 (angle of the filler) was measured. If 95% by mass or more of the filler had an angle of the filler of −5 to 5°, it was evaluated as A. If 95% by mass or more of the filler had an angle of the filler of not less than −10° and less than −5° or more than 5° and not more than 10°, it was evaluated as B. If 95% by mass or more of the filler had an angle of the filler of less than −10° or more than 10°, it was evaluated as C. The angle of the filler was derived by observing the positional relationship between the filler and the surface with an optical microscope and measuring the positional relationship with a protractor. The numeric values of the angle of the filler and their evaluation results are shown in Tables 9 to 11.

TABLE 1

| | | Composition 1-1 | Composition 1-2 | Composition 1-3 |
|---|---|---|---|---|
| (A) Thermoplastic resin | A-1 | 30 | 30 | 30 |
| | A-2 | 70 | 70 | 70 |

TABLE 1-continued

|  |  | | | |
|---|---|---|---|---|
|  | A-3 | — | — | — |
|  | A-4 | — | — | — |
|  | A-5 | — | — | — |
|  | A-6 | — | — | — |
|  | A-7 | — | — | — |
|  | A-8 | — | — | — |
|  | A-9 | — | — | — |
| (B) Filler | B-1 | 2 | — | — |
| (colored metallic | B-2 | — | 2 | — |
| pigment) | B-3 | — | — | 2 |
| Others | X-1 | 0.5 | 0.5 | 0.5 |

|  |  | Composition 1-4 | Composition 1-5 | Composition 1-6 |
|---|---|---|---|---|
| (A) Thermoplastic resin | A-1 | 30 | 30 | 30 |
|  | A-2 | 70 | 70 | 20 |
|  | A-3 | — | — | 50 |
|  | A-4 | — | — | — |
|  | A-5 | — | — | — |
|  | A-6 | — | — | — |
|  | A-7 | — | — | — |
|  | A-8 | — | — | — |
|  | A-9 | — | — | — |
| (B) Filler | B-1 | — | — | — |
| (colored metallic | B-2 | 4 | 15 | 2 |
| pigment) | B-3 | — | — | — |
| Others | X-1 | 0.5 | 0.5 | 0.5 |

TABLE 2

|  |  | Composition 1-7 | Composition 1-8 | Composition 1-9 | Composition 1-10 |
|---|---|---|---|---|---|
| (A) Thermoplastic resin | A-1 | — | 30 | 30 | 30 |
|  | A-2 | — | 20 | 20 | 70 |
|  | A-3 | — | — | — | — |
|  | A-4 | 100 | 50 | — | — |
|  | A-5 | — | — | 50 | — |
|  | A-6 | — | — | 5 | — |
|  | A-7 | — | — | — | — |
|  | A-8 | — | — | — | — |
|  | A-9 | — | — | — | — |
| (B) Filler (colored metallic pigment) | B-1 | — | — | — | — |
|  | B-2 | 2 | 2 | 2 | 25 |
|  | B-3 | — | — | — | — |
| Others | X-1 | 0.5 | 0.5 | 0.5 | 0.5 |

|  |  | Composition 1-11 | Composition 1-12 | Composition 1-13 | Composition 1-14 |
|---|---|---|---|---|---|
| (A) Thermoplastic resin | A-1 | — | — | — | — |
|  | A-2 | — | — | — | — |
|  | A-3 | — | — | — | — |
|  | A-4 | — | — | — | — |
|  | A-5 | 100 | — | — | — |
|  | A-6 | — | — | — | — |
|  | A-7 | — | 100 | — | — |
|  | A-8 | — | — | 100 | — |
|  | A-9 | — | — | — | 100 |
| (B) Filler (colored metallic pigment) | B-1 | — | — | — | — |
|  | B-2 | 2 | 2 | 2 | 2 |
|  | B-3 | — | — | — | — |
| Others | X-1 | 0.5 | 0.5 | 0.5 | 0.5 |

TABLE 3

|  |  | Composition 2-1 | Composition 2-2 | Composition 2-3 | Composition 2-4 |
|---|---|---|---|---|---|
| (A) Thermoplastic resin | A-1 | 25 | 30 | 25 | — |
|  | A-2 | 75 | 70 | 75 | — |
|  | A-4 | — | — | — | 100 |

TABLE 3-continued

|  |  | Composition 2-1 | Composition 2-2 | Composition 2-3 | Composition 2-4 |
|---|---|---|---|---|---|
|  | A-5 | — | — | — | — |
|  | A-6 | — | — | — | — |
| (B) Filler | B-4 | 20 | — | — | — |
|  | B-5 | — | 5 | 20 | 50 |
| Others | X-1 | 0.5 | 0.5 | 0.5 | 0.5 |

TABLE 4

|  |  | Composition 2-5 | Composition 2-6 | Composition 2-7 | Composition 2-8 |
|---|---|---|---|---|---|
| (A) Thermoplastic resin | A-1 | 30 | 25 | 30 | 20 |
|  | A-2 | 20 | 25 | 70 | 80 |
|  | A-4 | 50 | — | — | — |
|  | A-5 | — | 42 | — | — |
|  | A-6 | — | 8 | — | — |
| (B) Filler | B-4 | — | — | — | — |
|  | B-5 | 45 | 30 | 55 | 3 |
| Others | X-1 | 0.5 | 0.5 | 0.5 | 0.5 |

TABLE 5

|  | Example 1-1 | Example 1-2 | Example 1-3 |
|---|---|---|---|
| Thermoplastic resin Composition | Composition 1-1 | Composition 1-2 | Composition 1-3 |
| Resin temperature [° C.] | 240 | 240 | 240 |
| Mold set temperature [° C.] | 230 | 230 | 230 |
| Mold surface temperature [° C.] | 219 | 218 | 218 |
| Difference between resin temperature and mold surface temperature [° C.] | 21 | 22 | 22 |
| Weld line | A | A | A |
| Flow unevenness | A | A | B |
| Brightness | A | A | A |
| Color tone | A | A | A |
| Angle of colored metallic pigment | 3° | 3.5° | 3° |
| Surface sink mark | B | B | B |

|  | Example 1-4 | Example 1-5 | Example 1-6 |
|---|---|---|---|
| Thermoplastic resin Composition | Composition 1-4 | Composition 1-5 | Composition 1-6 |
| Resin temperature [° C.] | 240 | 240 | 240 |
| Mold set temperature [° C.] | 230 | 230 | 230 |
| Mold surface temperature [° C.] | 220 | 218 | 218 |
| Difference between resin temperature and mold surface temperature [° C.] | 20 | 22 | 22 |
| Weld line | A | A | A |
| Flow unevenness | A | B | A |
| Brightness | A | A | A |
| Color tone | A | A | A |
| Angle of colored metallic pigment | 4° | 5.5° | 3° |
| Surface sink mark | B | B | B |

TABLE 6

|  | Example 1-7 | Example 1-8 | Example 1-9 |
|---|---|---|---|
| Thermoplastic resin Composition | Composition 1-3 | Composition 1-3 | Composition 1-3 |
| Resin temperature [° C.] | 250 | 250 | 250 |
| Mold set temperature [° C.] | 230 | 230 | 230 |

TABLE 6-continued

|  | | | |
| --- | --- | --- | --- |
| Mold surface temperature [° C.] | 219 | 219 | 219 |
| Difference between resin temperature and mold surface temperature [° C.] | 31 | 31 | 31 |
| Weld line | A | A | A |
| Flow unevenness | B | A | A |
| Brightness | A | A | A |
| Color tone | A | A | A |
| Angle of colored metallic pigment | B 5.5° | A 3° | A 3° |
| Surface sink mark | B | B | B |

|  | Example 1-10 | Example 1-11 | Example 1-12 |
| --- | --- | --- | --- |
| Thermoplastic resin Composition | Composition 1-2 | Composition 1-2 | Composition 1-2 |
| Resin temperature [° C.] | 240 | 221 | 190 |
| Mold set temperature [° C.] | 190 | 190 | 180 |
| Mold surface temperature [° C.] | 182 | 182 | 175 |
| Difference between resin temperature and mold surface temperature [° C.] | 58 | 39 | 15 |
| Weld line | A | A | A |
| Flow unevenness | B | A | B |
| Brightness | A | A | A |
| Color tone | A | A | A |
| Angle of colored metallic pigment | B 6° | A 4° | B 5.5° |
| Surface sink mark | B | B | B |

TABLE 7

|  | Example 1-13 | Example 1-14 | Example 1-15 |
| --- | --- | --- | --- |
| Thermoplastic resin Composition | Composition 1-2 | Composition 1-2 | Composition 1-6 |
| Resin temperature [° C.] | 240 | 241 | 240 |
| Mold set temperature [° C.] | 230 | 230 | 230 |
| Mold surface temperature [° C.] | 218 | 219 | 218 |
| Difference between resin temperature and mold surface temperature [° C.] | 22 | 22 | 22 |
| Weld line | A | A | A |
| Flow unevenness | A | B | A |
| Brightness | A | A | A |
| Color tone | A | A | A |
| Angle of colored metallic pigment | A 2.5° | B 5.5° | A 3° |
| Surface sink mark | A | B | B |

|  | Example 1-16 | Example 1-17 | Example 1-18 |
| --- | --- | --- | --- |
| Thermoplastic resin Composition | Composition 1-7 | Composition 1-8 | Composition 1-9 |
| Resin temperature [ C.] | 250 | 250 | 265 |
| Mold set temperature [ C.] | 230 | 230 | 230 |
| Mold surface temperature [ C.] | 219 | 219 | 218 |
| Difference between resin temperature and mold surface temperature [° C.] | 31 | 31 | 47 |
| Weld line | A | A | A |
| Flow unevenness | A | A | B |
| Brightness | A | A | A |
| Color tone | A | A | A |
| Angle of colored metallic pigment | A 3° | A 3° | A 4° |
| Surface sink mark | B | A | B |

TABLE 8

|  | Example 1-19 | Example 1-20 | Example 1-21 | Example 1-22 |
| --- | --- | --- | --- | --- |
| Thermoplastic resin Composition | Composition 1-11 | Composition 1-12 | Composition 1-13 | Composition 1-14 |
| Resin temperature [° C.] | 281 | 282 | 211 | 280 |
| Mold set temperature | 260 | 260 | 180 | 250 |
| Mold surface temperature [° C.] | 248 | 249 | 175 | 238 |
| Difference between resin temperature and mold surface temperature [° C.] | 33 | 33 | 36 | 42 |
| Weld line | A | A | A | A |
| Flow unevenness | A | A | A | A |
| Brightness | A | A | A | A |
| Color tone | A | A | A | A |
| Angle of colored metallic pigment | B 6° | B 6° | A 4° | A 4° |
| Surface sink mark | B | B | B | B |

|  | Comparative Example 1-1 | Comparative Example 1-2 | Comparative Example 1-3 | Comparative Example 1-4 |
| --- | --- | --- | --- | --- |
| Thermoplastic resin Composition | Composition 1-2 | Composition 1-2 | Composition 1-10 | Composition 1-14 |
| Resin temperature [° C.] | 240 | 241 | 240 | 300 |
| Mold set temperature [° C.] | 180 | 120 | 190 | 200 |
| Mold surface temperature [° C.] | 175 | 120 | 182 | 190 |
| Difference between resin temperature and mold surface temperature [° C.] | 65 | 121 | 58 | 110 |
| Weld line | A | B | B | B |
| Flow unevenness | C | D | C | D |
| Brightness | A | A | B | A |
| Color tone | A | A | A | A |
| Angle of colored metallic pigment | C 11° | C 25° | C 10.5° | C 12° |
| Surface sink mark | B | A | B | B |

TABLE 9

|  | Example 2-1 | Example 2-2 | Example 2-3 | Example 2-4 | Example 2-5 |
| --- | --- | --- | --- | --- | --- |
| Thermoplastic resin Composition | Composition 2-1 | Composition 2-2 | Composition 2-3 | Composition 2-4 | Composition 2-5 |
| Resin temperature [° C.] | 240 | 240 | 240 | 265 | 250 |
| Mold set temperature [° C.] | 230 | 230 | 230 | 230 | 230 |
| Mold surface temperature [° C.] | 219 | 218 | 218 | 220 | 218 |
| Difference between resin temperature and mold surface temperature [° C.] | 21 | 22 | 22 | 45 | 32 |
| Weld line | A | A | A | A | A |
| Flow unevenness | A | A | A | A | A |
| Sharpness | A | A | A | A | A |
| Falling weight impact value | 2.5 | 5.4 | 2.5 | 2.7 | 2.1 |
| Angle of filler | A 1° | A 1° | A 1° | A 2° | A 1.5° |
| Surface sink mark | B | B | B | B | B |

TABLE 10

|  | Example 2-6 | Example 2-7 | Example 2-8 | Example 2-9 | Example 2-10 |
|---|---|---|---|---|---|
| Thermoplastic resin Composition | Composition 2-6 | Composition 2-3 | Composition 2-3 | Composition 2-3 | Composition 2-6 |
| Resin temperature [° C.] | 260 | 221 | 240 | 251 | 250 |
| Mold set temperature [° C.] | 230 | 180 | 190 | 230 | 230 |
| Mold surface temperature [° C.] | 218 | 175 | 182 | 219 | 218 |
| Difference between resin temperature and mold surface temperature [° C.] | 42 | 46 | 58 | 32 | 32 |
| Weld line | A | A | A | A | A |
| Flow unevenness | A | B | B | A | A |
| Sharpness | A | A | A | A | A |
| Falling weight impact value | 6.5 | 2.3 | 2.4 | 2.7 | 6.7 |
| Angle of filler | A 3° | B 5.5° | A 3° | A 1° | A 1° |
| Surface sink mark | B | B | B | A | A |

TABLE 11

|  | Example 2-11 | Example 2-12 | Example 2-13 |
|---|---|---|---|
| Thermoplastic resin Composition | Composition 2-3 | Composition 2-3 | Composition 2-8 |
| Resin temperature [° C.] | 180 | 240 | 240 |
| Mold set temperature [° C.] | 170 | 230 | 230 |
| Mold surface temperature [° C.] | 167 | 218 | 219 |
| Difference between resin temperature and mold surface temperature [° C.] | 13 | 22 | 21 |
| Weld line | B | A | A |
| Flow unevenness | B | B | B |
| Sharpness | A | A | A |
| Falling weight impact value | 1.8 | 2.4 | 4 |
| Angle of filler | B 5.5° | B 5.5° | A 1° |
| Surface sink mark | B | B | A |

|  | Comparative Example 2-1 | Comparative Example 2-2 | Comparative Example 2-3 |
|---|---|---|---|
| Thermoplastic resin Composition | Composition 2-3 | Composition 2-3 | Composition 2-7 |
| Resin temperature [° C.] | 240 | 241 | 240 |
| Mold set temperature [° C.] | 180 | 120 | 190 |
| Mold surface temperature [° C.] | 175 | 120 | 182 |
| Difference between resin temperature and mold surface temperature [° C.] | 65 | 121 | 58 |
| Weld line | A | B | B |
| Flow unevenness | C | D | C |
| Sharpness | A | A | B |
| Falling weight impact value | 1.9 | 1.7 | 1.9 |
| Angle of filler | C 10.5° | C 15° | B 6° |
| Surface sink mark | B | A | A |

The present application is based on Japanese Patent Applications (Nos. 2010-223112 and 2010-223114) filed on Sep. 30, 2010, the contents of which are incorporated herein by reference.

INDUSTRIAL APPLICABILITY

The injection molded article according to the present invention has sufficiently reduced strip-like unevenness in the weld, consistent brightness on the entire surface, and a luxurious and deep metallic color tone. Accordingly, the injection molded article according to the present invention can eliminate coating of products in parts in broad fields such as automobile parts and home appliance parts, which are used to be coated in the related art.

REFERENCE SIGNS LIST

1 . . . surface of injection molded article, 2 . . . filler (colored metallic pigment), 3 . . . weld, 5 . . . weld line.

The invention claimed is:

1. A method for producing an injection molded article comprising:
providing a thermoplastic resin composition comprising 100 parts by mass of a thermoplastic resin and 50 parts by mass or less of a filler;
conducting injection molding by injecting to a mold the thermoplastic resin composition under a temperature condition in which a difference between a mold temperature and a temperature of the thermoplastic resin composition is 0 to 60° C. to obtain the injection molded article, so that the injection molded article has at least one weld, and a long diameter of 95% by mass or more of the filler existing within a cross-sectional depth of 50 μm or less from a surface of the weld is substantially parallel to the surface of the weld, and the substantially parallel means that the long diameter of the filler and the surface of the weld form an angle from −10° to +10°.

2. The method for producing an injection molded article according to claim 1, wherein the injection molded article is obtained by the injection molding using a mold including a product cavity and a spillover cavity located downstream, in a flow direction of the thermoplastic resin composition, of the product cavity.

3. The method for producing an injection molded article according to claim 1, wherein the injection molding is gas-assist molding.

4. The method for producing an injection molded article according to claim 1, wherein the thermoplastic resin contains a non-crystalline resin, and is injection molded at a mold temperature 60° C. or more higher than a glass transition temperature of the non-crystalline resin.

5. The method for producing an injection molded article according to claim 1, wherein the thermoplastic resin contains a crystalline resin, and is injection molded at a temperature 20° C. or more higher than a melting point of the crystalline resin.

6. The method for producing an injection molded article according to claim 1, wherein the filler contains 0.1 to 20 parts by mass of a colored metallic pigment based on 100 parts by mass of the thermoplastic resin.

7. The method for producing an injection molded article according to claim 1, wherein an amount of the filler is 5 parts by mass or more and 50 parts by mass or less based on 100 parts by mass of the thermoplastic resin.

8. The method for producing an injection molded article according to claim 1, wherein the difference between the mold temperature and the temperature of the thermoplastic resin composition is 21 to 60° C.

* * * * *